March 30, 1965 K. LEITNER 3,175,452
FASTENING MEANS
Filed Dec. 15, 1961 2 Sheets-Sheet 1

Inventor
KAJETAN LEITNER
By Toulmin & Toulmin
Attorneys

March 30, 1965 K. LEITNER 3,175,452
FASTENING MEANS
Filed Dec. 15, 1961 2 Sheets-Sheet 2
FIG. 13
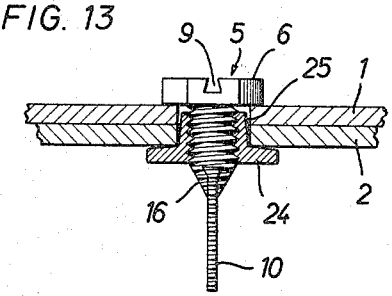
FIG. 14 FIG. 15 FIG. 16
 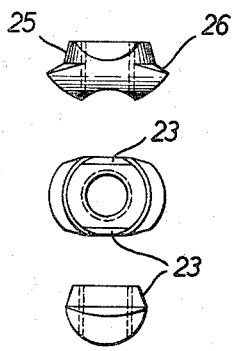 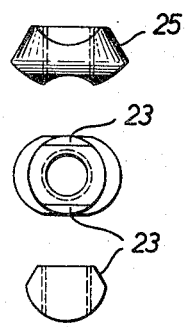
FIG. 17 FIG. 20 FIG. 21
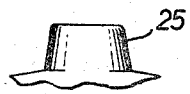  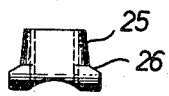
FIG. 18 FIG. 22 FIG. 23
 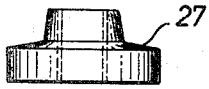 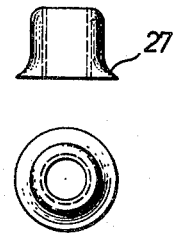
FIG. 19
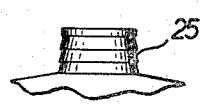 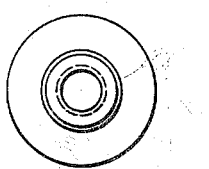
Inventor
KAJETAN LEITNER
By Toulmin & Toulmin
Attorneys United States Patent Office
3,175,452
Patented Mar. 30, 1965

3,175,452
FASTENING MEANS
Kajetan Leitner, 301 Ameghino, Beccar,
Buenos Aires, Argentina
Filed Dec. 15, 1961, Ser. No. 160,425
Claims priority, application Austria, June 22, 1961,
A 4,827/61
5 Claims. (Cl. 85—3)

The present invention relates to a fastener for members whose rear sides are inaccessible in the connected position, more particularly, to a nut and bolt fastener wherein means are provided for inserting both the bolt and the nut thereon through the holes in the members which are to be fastened.

Many forms of fasteners have been developed for special applications, however, the fasteners developed for connecting two members whose rear sides are inaccessible are generally unsatisfactory. The disadvantages of such fasteners are that either they are complicated and hence expensive to manufacture or difficult to use since they require special techniques or special tools. There are many instances where the rear side of connected members are in accessible such as when connecting the ends of tubes together. In some situations the rear sides of the connected members are inaccessible only after the members have been connected whereas in other structures the rear sides of the individual members are inaccessible even before being connected together.

It is therefore the principal object of the present invention to provide a nut and bolt fastener for connecting members together whose rear sides are inaccessible.

It is another object of this invention to provide a fastener for members whose rear sides are inaccessible utilizing a standard bolt which has been somewhat modified.

It is an additional object of the present invention to provide a nut and bolt fastener for members whose rear sides are inaccessible wherein both the bolt and the nut are passed through holes bored in the members to be fastened.

The fastener of the present invention essentially comprises a standard bolt which has a flexible extension projecting from the end of the threaded portion. This flexible extension has a width substantially equal to the diameter of the threaded portion and the threads on the shank are continued over the edges of the flexible extension. An elongated nut having a substantially rectangular shape can then be threaded onto the flexible portion. The flexible portion can then be bent into a position so as to permit the nut to be inserted into the holes in the members together with the end of the bolt. When the nut has been inserted through the holes and is at the rear side of the inner member, the flexible strip will straighten out and the nut then can be drawn up against the threaded portion of the bolt to fasten the two members together.

Various forms of the bolt, the extension and the nut are disclosed which are adapted for particular applications.

Other objects and advantages of this invention will be apparent upon reference to the accompanying description when taken in conjunction with the following drawings, wherein FIGURE 1 is a sectional view through members secured by the nut and bolt fastener of the present invention with the nut being of the collarless type.

FIGURE 13 is a view similar to that of FIGURE 1 but showing a nut with a collar;

FIGURES 14, 15 and 16 each show three views of various forms of collar nuts;

FIGURES 17, 18 and 19 show elevational views of various shapes of collar nuts;

FIGURES 20 and 21 show the shapes of collar nuts used for relatively soft and relatively hard materials, respectively;

FIGURES 22 and 23 show elevational and plan views of two different forms of disposable collar nuts.

Figure 1:
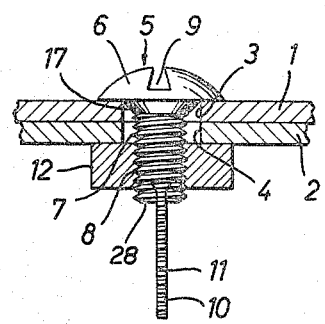

Proceeding next to the drawings wherein like reference symbols indicate the same parts throughout the various views, the present invention together with several modifications thereof will be described in detail. With particular reference to FIGURE 1 wherein is illustrated a joint or connection formed by utilizing the fastener of the present invention, there is shown an outer member 1 and an inner member 2 which have holes 3 and 4, respectively, bored therethrough. The holes 3 and 4 are of substantially the same diameter but may be of unequal diameters. In the event the holes 3 and 4 are unequal in diameter, then the smaller diameter hole would govern the various relationships of the fastener which will be described in detail later.

The fastener comprises a conventional solid or hollow bolt 5 having a head 6 and a shank 7 extending therefrom with threads 8 on the shank. The head 6 of the bolt is provided with a slot 9.

The end of the shank indicated at 28 has a flat flexible extension 10 projecting from the end thereof. This extension has a width which is substantially equal to the diameter of the threaded portion of the shank. The threads 8 are continued on the flat extension 11.

A nut 12 whose various shapes are presently described is threaded upon the threaded portion 8 against the inner member 2 to secure the two members 1 and 2 together.

Figure 2:
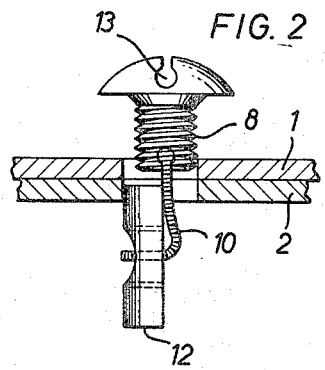
FIGURE 2 is a sectional view of the two members which are to be connected showing the manner in which the nut and bolt are simultaneously inserted through the holes in the members.
Figure 3:
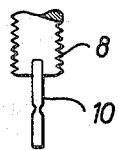
FIGURES 3 through 9 are elevational views of various forms of the flexible extension on the end of the threaded portion of the bolt.
Figure 12:
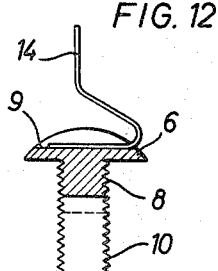
FIGURE 12 is a longitudinal sectional view of a bolt of the present invention showing the manner in which a special screw driver is received in the slots.

In utilizing the fastener of the present invention the nut 12 is threaded onto the extension 10 to a position substantially as shown in FIGURE 2. The nut 12 is elongated in shape and may have a rectangular shape so as to fit through the openings 3 and 4. The nut 12 is then pivoted to a position substantially as shown in FIGURE 2 wherein the longitudinal axis of the nut 12 is substantially parallel to the longitudinal axis of the bolt 5. The nut and bolt are then inserted through the openings 3 and 4 as shown in FIGURE 2. When the bolt has been completely inserted into the openings 3 and 4 so that the head 6 rests against the member 1, the extension 10 will straighten itself out because of its inherent resiliency. A special form of screw driver such as shown in FIGURE 12 is then inserted into the slot 9 which may have a dovetail shape as shown in FIGURE 1 or may have a groove 13 as shown in FIGURE 2. With this special form of screw driver 14 the nut and bolt are pulled outwardly so that the nut 12 is held against the rear surface of the member 2. In this position the bolt may be rotated so that the nut is threaded onto the bolt and there is no relative movement between the nut and the members 1 and 2.

Upon continuous threading of the nut, the nut will be threaded upon the shank 7 into the position as shown in FIGURE 1. When the nut has gripped the threads of the shank, the extension is no longer used and does not contribute in any way to the connection.

The extension is only used again when the members 1 and 2 are to be disconnected and the nut and bolt are loosened so that the nut and bolt may be pulled outwardly through the bore holes 3 and 4. Thus, the action of disconnecting the members 3 and 4 is the reverse of the securing process as described immediately above.

Figure 8:
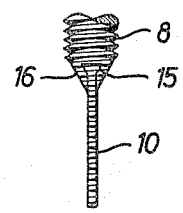
Figure 9:
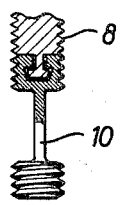

The flat extension 10 may be formed in various ways on the bolt as shown in FIGURES 3 through 9. The extension 10 may be attached to the end of the bolt by welding or soldering or the end of the extension may have an enlarged head 15 such as shown in FIGURE 8. The enlarged head is then tightly fitted into a corresponding opening in the end of the bolt which may be tapered as shown at 16, also in FIGURE 8. When the end of the bolt is tapered as at 16, the threads 8 also continue along this tapered portion onto the flat extension 10.

Figure 4:
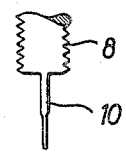
Figure 5:
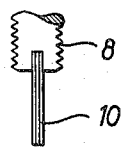
Figure 6:
Figure 7:
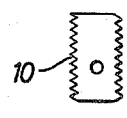

As seen in FIGURE 4, the shank and extension may also be in one integral unit.

The bolt 5 may be provided with a centering collar 17 such as is shown in FIGURE 1. If the length of the collar 17 is greater than the thickness of the members 1+2, then a connection between members 1 and 2 can be obtained which will permit a certain degree of play therebetween. The type of the connection desired between members 1 and 2 will determine the shape of the centering collar 17.

The various forms of nuts which can be used with the fastener of the present invention can be divided into basically two types.

(1) Disposable nuts (FIGURES 1, 2, 10, 13, 14, 20 and 21). These nuts can be inserted into the holes together with the bolt but cannot be withdrawn from the holes together with the bolt when the fastening is disconnected. The bolts merely drop off into the interior.

Figure 11:
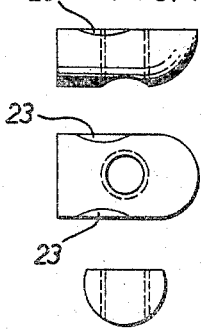

(2) Retrievable nuts (see FIGURES 11, 15 and 16). These nuts have the properties of the disposable nuts but, in addition, can be withdrawn from the bore holes together with the bolt when the fastening is disconnected.

Figure 10:
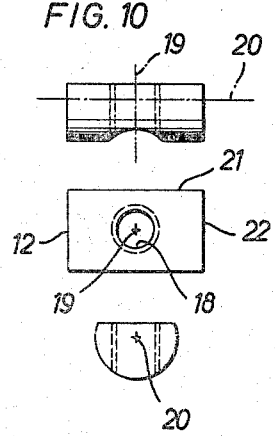
FIGURES 10 and 11 show respectively three views of collarless nuts used in the present fastener.

The basic shape of the nuts can be seen in FIGURES 10 and 11 wherein the nut is essentially the shape of a cylindrical segment. The radius of this segment is equal to or less than the radius of the holes in the members to be connected. The maximum possible height or thickness of the nut depends on the following relation:

Height of nut + radius of bolt ≦ diameter of the bore holes.

As seen in FIGURE 10, the nut 12 is provided with a threaded bore 18 with the longitudinal axis of this bore as indicated at 19 intersecting the longitudinal axis of the cylindrical segment as indicated at 20 at right angles.

The threaded bore 18 divides the body of the rectangular nut into two sides or end portions 21 and 22. These end portions or sides may have either equal or unequal lengths. In the event the sides are of unequal length, then the shorter side must be longer than the diameter of the bore hole minus the radius of the bolt.

In nuts having a collar such as will be later described the shorter side must be longer than the radius of the bore hole. The lengths of both sides of a disposable nut and of one side of a retrievable nut do not have any limitations imposed thereon due to the functions of the nuts.

The maximum possible height or thickness of the nut as given above holds true when the length of the extension is equal to the length of the shorter side + the height of the nut. In those cases where the extension is longer, the height of the nut is not determined by the above relationship but can be almost equal to the diameter of the cylindrical segment of the nut. In this case it is only necessary to provide the space required for the extension.

While no further dimensions are necessary with respect to the shape of a disposable nut, additional dimensions are required for the shape of the retrievable nut.

At least one side of the retrievable nut must be formed so it can readily enter the bore holes when the bolt is eccentrically positioned therein and when, at the same time, the extension is under tension because of the nut being positioned parallel to the bolt, as shown in FIGURE 2 of the drawings. In order that the nut may be readily pivoted or tilted within the bore holes, that side of the nut which is to be tilted is formed as a spherical segment as the maximal possible volume. This spherical segment is formed by rotating the circumference of the bore hole about the pivot point of the nut. In addition, the edges of the nut or collar, respectively, have indentations therein as shown at 23 in FIGURES 11, 15 and 16. The presence of these indentations or curved recesses avoids any binding of the nut between the extension and that side of the nut which does not pivot in. Any such binding because of a contact of the nut surface would either eliminate any possibility of tilting the nut into the bore holes or would render this tilting considerably more difficult.

The fastener of this invention may also be provided with collar nuts which may be either disposable or retrievable. These collar nuts have a portion which extend into the bore hole between the shank of the bolt and the wall of the holes. As such these collars transmit either completely or a portion of the force exerted by the tightened bolt onto the wall of the hole, so that, with collar nuts the diameter of the bore hole can be smaller with respect to the diameter of the bolt than when collarless nuts are used. This assumes, of course, that the nuts under consideration have the same capacity.

In FIGURE 13 there is shown a nut 24 which has a collar 25. The collar 25 extends over only a portion of the entire height or thickness of the nut 24.

In FIGURES 16 and 23 there are also illustrated collar nuts wherein the collar extends over the entire height of the nut.

FIGURES 14, 15, 20, 21 and 22 also illustrate nuts wherein the collar extends over only a portion of the entire height or thickness of the nut.

The collar nut shown in FIGURE 16 has its upper end or the end which is closer to the head of the bolt of a diameter which is substantially equal to the diameter of the bore holes 3 and 4. From this end the nut increases its diameter gradually so as to have substantially the shape of a cone. The shape of the nut is not limited to that of a cone but the diameter may increase from one end to the other in any desired manner.

In FIGURE 15 the diameter of the collar gradually increases not to the end of the nut but to the contact or bearing surface indicated at 26.

As shown in FIGURES 17, 18 and 19 the collars may have various shapes.

The pitch or angle of the wall of the collar with the longitudinal axis of the nut is dependent upon the materials of the members 1 and 2 into which the collar of the nut is to be pressed. This angle is greater and may range up to 30° (see FIGURE 20) when the materials are relatively soft, such as, for example, aluminum, copper, brass, wood, bakelite, plastics and rubber.

This is relatively flat ranging up to about 4° when harder materials are joined, for example, steels, glass, ceramics, stone, and concrete. It should be borne in mind that the line between "hard" and "soft" materials in relation to this invention is not clear and the above materials are cited as examples only.

The same basic relationship exists in the ratio of the height of the collar with respect to the height of the body because of the distribution of the load between the collar and the body. In practice, the height of the collar will always be greater than 20% of the height of the body, and may be 100%. In this latter case, the entire load received by the nut is transmitted to the wall of the bore.

The thickness of the collar and the area of the bearing surface of the nut also depend upon the softness and thickness of the interior connected member 2. However, the height of the collar should not exceed the thickness of the materials which are to be connected.

The collar nut is positioned on the rear or inaccessible side of the members to be connected by utilizing an extension on the bolt in the manner as described above. When the bolt is drawn outwardly care must be taken to ensure that the end of the collar is accurately positioned within the bore hole. Subsequently, only a light force is necessary during the screwing of the bolt into the nut to prevent the nut from following this rotary movement. In most cases the friction between the nut and the bore hole is sufficient to hold the nut stationary by exerting only a light force pulling the bolt to the outside. In addition, since the nut is already centered into the bore hole, this facilitates threading of the bolt into the nut and avoids any damage to the threaded extension. When the head of the bolt reaches the bearing surface or exterior surface of the member 1, the collar of the nut may be drawn further into the bore hole by additional tightening of the bolt. This will result in a press-fit of the collar within the bore hole. After this tightening the collar nut is automatically secured against any loosening or falling off the bore hole.

When the fastening employing a collar bolt is disconnected, the nut may be simply pushed to the interior in the case of a disposable nut.

In the case of a retrievable nut which is to be recovered, the bolt is merely unloosened until its head is spaced a distance from its bearing surface corresponding to the height of the collar of the nut. When the bolt is now pushed inwardly until it stops, the nut is disengaged from the wall of the bore hole and is freely movable on the thread of the bolt. When the bolt is further unthreaded, the nut is conveyed from the shank onto the extension and thus can be removed together with the bolt in a manner as previously described.

In those applications wherein the members 1 and 2 are drilled prior to assembly, so that these sides are accessible as individual members but are inaccessible when the members 1 and 2 are connected together, the collar nuts may be merely driven or otherwise secured into the interior member. This securing may be by various means such as by welding. When the nut is to be used as a disposable nut, then there are no limitations on the height of the nut with respect to the diameter of the bore hole. The body of the nut may then be provided with an annular seat 27 such as illustrated on the two nuts shown in FIGURES 22 and 23. This circular shape is possible since there is no intention of recovering this nut and hence there is no necessity for the nut to have any size which would enable the nut to be drawn through the bore holes.

In those applications whereby the rear sides of both members are inaccessible prior to the connection thereof, the various forms of nuts previously described may be used.

The tool for both threading the bolt and for pulling the bolt to the outside during the connection thereof may in addition to the structure shown in FIGURE 12 comprise a conventional screw driver having an enlargement on the tip thereof.

The essential characteristics of the nut according to the invention can be summarized as follows: The collar is similar to a frusto-conical member which is tapered toward the head of the bolt, the smaller diameter of which can be equal to or smaller than the diameter of the bore and the greater diameter of which must be greater than the bore. The bore thread extends axially and concentrically through this frustum. The angle formed between the flank of the collar and the axis of the bore reaches approximately 4 degrees when "harder" materials are employed and up to 30 degrees, in case "softer" materials are used. The angle of the flank depends of the condition of the material of which the interior connecting members are made, of the material of which the nut is made (for it may also consist of harder or softer materials including plastics), of the height of the collar and of the strength of the interior connecting member. Thus, again several factors have to be considered with respect to the shape of the angle.

In practice one type of nut will be sufficient for the "harder" as well as for the "softer" materials, so that only in the two extreme cases in which glass or rubber are employed, will correspondingly modified embodiments be required.

Thus it can be seen that the present invention provides a simplified fastening which can be easily used for connecting members whose rear sides are inaccessible both before and after assembly.

It will be understood that this invention is susceptible to modification in order to adapt it to different usages and conditions and, accordingly, it is desired to comprehend such modifications within this invention as may fall within the scope of the appended claims.

What is claimed as this invention is:

1. A fastener particularly adapted for connecting members whose rear sides are inaccessible, and comprising a bolt having a head and a threaded shank extending therefrom, a flat flexible resilient, non-metallic extension projecting axially from the end of said shank, means securing the extension to the bolt shank, said extension having a width equal to the diameter of the shank and having said threads continued on the edges thereof, and an elongated nut threadedly mounted on said extension, said extension being bendable transversely of the axis of the shank to permit the nut to move with the extension through an angle of up to substantially 90°.

2. A fastener as claimed in claim 1 wherein said extension is integral and homogeneous with said shank of the bolt.

3. A fastener particularly adapted for connecting members whose sides are inaccessible, and comprising a bolt having a head and a threaded shank extending therefrom, a single flat flexible resilient and plastic extension axially attached to the end of said shank, said extension being detachably mounted on said shank end and having a width equal to the diameter of the shank and longitudinally projecting therefrom, said extension having said threads continued on the edges thereof, and an elongated nut having threads thereon threadedly receiving axially first the extension and then the shank, said extension being bendable transversely of the axis of the shank to permit the nut to move with the extension through an angle of up to substantially 90°.

4. A fastener particularly adapted for connection to apertured members whose rear sides are inaccessible, and comprising a bolt having a head and a threaded shank extending therefrom, the end of said threaded shank being tapered edgewise down to a flat flexible resilient extension projecting axially and detachably from the end of said shank, means axially securing said resilient extension to the bolt shank, said extension having a width equal to the diameter of the shank, the threads on said shank continuing over said tapered portion and onto the edges of said extension, and an elongated nut mounted on the extension and having threads thereon threadedly engaging said extension, said extension being bendable transversely of the axis of the shank to permit the nut to move with the extension through an angle of as much as about 90°.

5. A fastener particularly adapted for members whose rear sides are inaccessible, and comprising a bolt having a head and a shank extending therefrom provided with threads, a flat flexible resilient extension projecting axially and detachably from the end of said shank, said extension being non-metallic and having a width equal to the diameter of the shank and having said threads continued on the edges thereof, means axially securing the resilient extension to the bolt shank, an elongated nut mounted on the resilient extension and having threads thereon threadedly engaging said extension, the extension being bendable transversely out of and back to general alignment with the axis of the shank to permit the nut to move with the extension through an angle of up to about 90°, and means formed on said bolt head for removably interlocking a mounting tool thereto so that said bolt can be axially shifted during mounting of the fastener to hold the nut against rotation on the inaccessible side of the member thereby to facilitate threading of the bolt shank into the nut.

References Cited in the file of this patent

UNITED STATES PATENTS

| | | | |
|---|---|---|---|
| 63,497 | Frank | Apr. 2, | 1867 |
| 1,394,608 | Davern | Oct. 25, | 1921 |
| 1,521,024 | Hubener | Dec. 30, | 1924 |
| 1,587,102 | Wrighton | June 1, | 1926 |
| 1,846,400 | Macfarlane | Feb. 23, | 1932 |
| 2,071,045 | Searles | Feb. 16, | 1937 |
| 2,098,721 | Demarest | Nov. 9, | 1937 |
| 2,241,506 | Eppler | May 13, | 1941 |
| 2,485,531 | Dzus et al. | Oct. 18, | 1949 |
| 2,765,134 | Hill | Oct. 2, | 1956 |
| 2,998,743 | Apfelzweig | Sept. 5, | 1961 |

FOREIGN PATENTS

| | | | |
|---|---|---|---|
| 1,038,363 | France | May 6, | 1953 |
| 1,084,089 | Germany | June 23, | 1960 |